United States Patent [19]
Hammarstedt

[11] 4,196,753
[45] Apr. 8, 1980

[54] FLOW REGULATOR

[75] Inventor: Gösta Hammarstedt, Alstermo, Sweden

[73] Assignee: Arcu Armaturindustri AB, Alstermo, Sweden

[21] Appl. No.: 915,901

[22] Filed: Jun. 15, 1978

[30] Foreign Application Priority Data

Jun. 30, 1977 [DE] Fed. Rep. of Germany ....... 2729458

[51] Int. Cl.² .............................................. G05D 7/01
[52] U.S. Cl. ..................................... 138/43; 137/504
[58] Field of Search ....................... 137/501, 504, 859; 138/43, 46

[56] References Cited

U.S. PATENT DOCUMENTS

| | | |
|---|---|---|
| 2,728,355 | 12/1955 | Dahl . |
| 2,762,397 | 9/1956 | Miller . |
| 2,878,836 | 3/1959 | Binks . |
| 2,989,086 | 6/1961 | Dahl ...................................... 138/43 |
| 3,194,272 | 7/1965 | Kogan . |
| 3,474,831 | 10/1969 | Noakes .................................. 138/43 |
| 4,141,379 | 2/1979 | Manske ........................... 137/859 X |

FOREIGN PATENT DOCUMENTS 1750923 11/1972 Fed. Rep. of Germany .
2425069 12/1975 Fed. Rep. of Germany .

Primary Examiner—Robert G. Nilson
Attorney, Agent, or Firm—Dann, Dorfman, Herrell and Skillman

[57] ABSTRACT

A flow regulator for controlling the flow of fluid, particularly water, to compensate for changes in pressure. The regulator comprises a fitting having an elastically-deformable membrane providing flow passages through the fitting. Pressure variations deform the membrane to modify the flow area of said passages to automatically compensate for the changes in pressure and thereby reduce or eliminate pressure waves arising in the pipe. The membrane comprises a disc-like base, the downstream surface of which is provided with spacer means leaving a star-like pattern of radial passages for medium flow having their outer ends open upstream for admission of fluid to said passages, the size of which is to be reduced by elastic deformation of said base and said spacer means in response to changes in the pressure in the flow.

12 Claims, 7 Drawing Figures

FLOW REGULATOR

The present invention concerns a flow regulator, particularly intended for incorporation between a water tap and an end of a water pipe.

Similar regulators are intended to reduce overpressures and to elastically intercept pressure waves in conduits, e.g. for protecting water mains and connecting parts from mechanical damage and simultaneously to eliminate noise or reduce such noice as far as possible.

With these objectives as background, flow regulators have previously been proposed, which partly achieve said objectives. These regulators are, however, fo the most part bulky and/or complicated, thus requiring certain space for installation as well as considerable manufacturing and assembing costs. Furhtermore, many previously-known regulators suffer from functional defects, which all together make an advantageous use of such flow regulators impossible.

An objective of the present invention is to counteract the aforementioned disadvantages and to eliminate them as far as possible. Furthermore, the invention is concerned with finding a new ways to improve techniques in this /field in various respects.

Said objectives are achieved according to the present invention by a flow regulator of the stated kind, which is characterized by an elastically-deformable means which controls the area of the flow passage means through the regulator.

Further characteristics and advantages of the invention are revealed by the following specification with reference to the accompanying drawings. These show a preferred practical embodiment of a flow regulator according to the invention.

Figure 3:
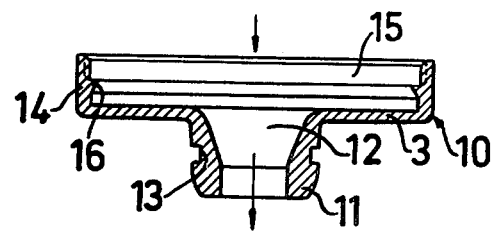
FIG. 3 show the outlet of a regulator according to FIG. 1 in a diametrical sectional view.
Figure 4:
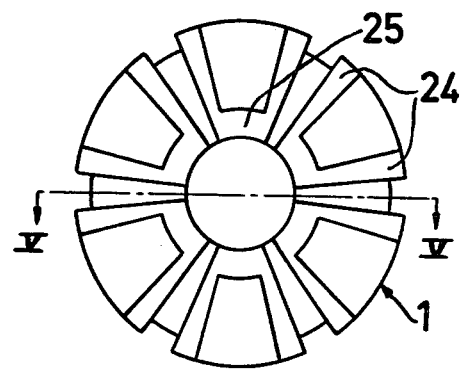

As shown by the drawings, a perffered embodiment of a flow regulator according to the invention is composed by three main parts. As shown in FIG. 3, there is an outlet part 10 constituted by a connector 11, which is connectable to a non-shown water tap and, as known per se, by means of a check nut 4. Hereby a locking ring 5 can be inserted into an outer annular groove 13 of the connector 11 to interlock and secure such parts, which are to be connected. Sid connector 11 comprises an outlet channel 12 and is widened upstream into a flange 3, the outer rim of which ends in an upstream-open annular socket 14. The outer part of the inner wall of said annular socket 14 is threaded at 15, and is limited towards said flange 3 by means of an annular shoulder 16 protruding from said inner wall.

Figure 1:
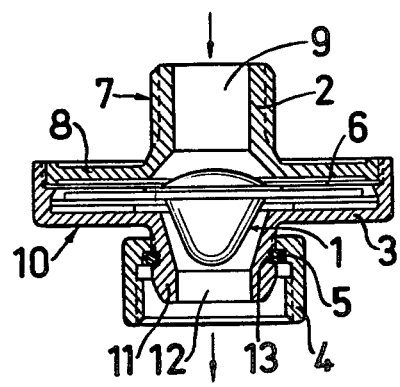
FIG. 1 shows the assembled flow regulator according to the invention shown in a diametrical sectional view.
Figure 2:
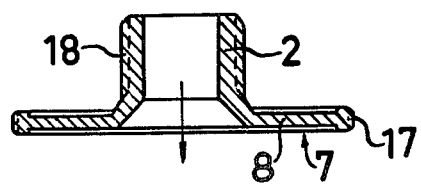
FIG. 2 shows the inlet of a regulator according to FIG. 1 in a diametrical sectional view.
Figure 7:
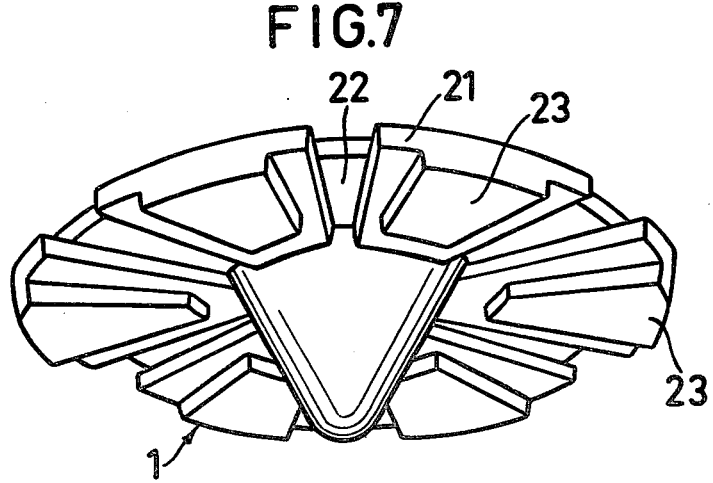
FIGS. 4-7 show the elastically-deformable membrane of a flow regulator according to FIG. 1, seen from below (FIG. 4); in a sectional view according to line V—V in FIG. 4 (FIG. 5); from above (FIG. 6); and in a perspective view (FIG. 7).

Into said socket 14 can be screwed an inlet part 7 (see FIG. 2) with a flange 8 having an outer thread 17 for this purpose. To said flage 8 is connected upstream with an inlet connector 2, which can be provided with an outer thread 18. As shown in FIG. 1, a gasket or sealing composition 6 is disposed between the flange 8 and the shoulder 16 to prevent leakage. Alternatively, the sealing composition may be used between the threads 15 and 17. Where disassembly is not required, the parts 8 and 14 may be press-fitted or otherwise bonded together to provide a seal without the use of the threads 15 and 17.

As third and most important main part of the regulator, there is provided a membrane 1, which is to be secured between the inlet part 7 and the outlet part 10. This membrane is completely or partly of rubber-elastic material and has a disc-like base 19 which, at its periphery, is spaced inwardly frcn the inner wall of said annular socket 14 within the shoulder 16. An approximately-conical diffuser 20 having a rounded tip protrudes downwardly from the center of base 19, which diffuser preferably is made in one piece with said base. On the same side of the base and disposed around the diffuser 20, spacer sectors 21 protrude, which preferably are shaped as sectors of a circle and with their interior ends abutting the diffuser. The outer ends of said sectors abut the interior wall of the annular socket 14 tightly, meanwhile the radial edges leave free-like flow passages 22 between one another, which passages accordingly are a star-like pattern and can taper towards the diffuser. As shown by the drawings, the outer or inlet area of the flow passages 22 is not covered by the base 19.

Upon the free major surface of said spaceer sectors is superposed restriction sectors 23 of similar shape but of smaller dimensions. The outer edges of the restriction sectors end jointly with said spacer sectors against the socket 14. The side of longitudinal edges of said restriction sectors leave free, however, low-pressure radical channels 24 in relation to the side or longitudinal edges of said spacer sectors, and the inner ends of said restriction sectors leave free a circumferential connecting channel 25 overlying the inner edge of said spacer sectors and extending between the restriction sectors and the diffuser.

Figure 5:
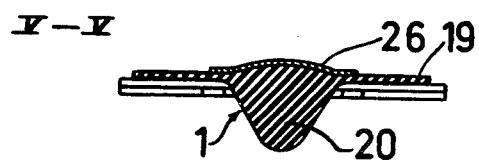
Figure 6:
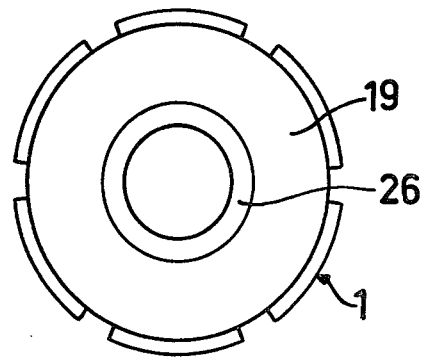

As furthermore shown by the drawings, on the opposite side of the base 19, which is turned away from the diffuser 20, the membrane 1 is provided with a central protection cap 26 preferably made of metal and vulcanized or in some other say attached to base 19. Said cap is circular and has a slightly convex center, the contoured inside of which is tightly abutted by the diffuser 20 of base 19. In a preferred embodiment, the diameter of cap 26 is slightly less than diametrical distance between two opposed restriction sectors 23, so that its periphery overlies the connecting channel 25, as shown in FIG. 5. This relationship can, however, be vice versa, so that its periphery overlies the restriction sectors and different effects are achieved, which will be described later. It is not necessary that the cap be convex, since a plain cap may be used if properly centered on the base.

Parts 19, 20, 21, 23 and 26 can at least in part be made in one piece of rubber or rubber-eleastic plastic, perhaps with the exception of cap 26. Alternatively, these parts at least partially may be assembled by vulcanization, so that a coherent unit is achieved.

A flow regulator, as described above and shown in the drawings, operates as follows:

At relatively low pressure in the mains or other water pipes, e.g. up to approximately 20 kpa, the regulator undergoes no substantial deformation, and water may pass substantially without any throttling other than the one brought about by the installation and the size of such a regulator. At increasing pressure, those parts of the base 19 which superpose the flow passages 22 will be pressed downwardly more and more towards said flange 3 and simultaneously those parts of said spacer sectors 21 which superpose low-pressure channels 24 and connecting 25 will be deflected downwardly. In such a way, a continuous throttling of the passing fluid medium is achieved until finally at a certain pressure level, e.g. approximately 100 kpa, channels 24 and 25 will be completely closed by deformation of the sectors 21 so that water or the like can flow only through the flow passages 22. In this way, the total free area of the flow passages through the resistor thus has been extensively limited. But, as the pressure simultaneously is relatively high, the quantity of discharged medium will be about constant or within a relatively uniform range, as desired.

The protection cap 26 is provided to prevent the diffuser 20 from being completely pushed into the outlet channel 12 and thus blocking the outlet. As already mentioned, a slightly smaller diameter of cap 26 in relation to the diametrical distance between two opposed restriction sectors 23 permits parts of the base 19 and the distance sectors 21 which superpose said connecting channel 25, at high pressure to be displaced into these connecting channels to reduce their size or to close them completely. If such an effect is to e prevented, however, the cap 26 should be given a slightly greater diameter than the distance between the two diametrically opposed restriction sectors 23, so that the periphery of cap 26 is supported by said restriction sectors, In this way, the connecting channel 25 cannot be reduced or at least cannot be completely closed.

The embodiments as described above and shown in the drawings are to be regarded as non-limiting examples only, which can be modified and completed in any way within the scope of the invention as defined by the following claims. I claim:

1. A flow regulator for a flow of fluid from an upstream inlet to a downstream outlet comprising an annular socket having an inner wall forming a flow passage, and elastically-deformable means to change the free area of the flow passage through said socket in response to variations of the pressure prevailing in the inlet, characterized in that said means comprises a membrane of elastice material have an imperforate disc-like base having one surface facing the upstream and having its periphery spaced from said inner wall to provide an annular flow passage therebetween, and the opposite surface facing downstream said opposite surface having sector-shaped spacer means providing radial edges extending outwardly thereof to abut said inner wall, at least one radial passage being formed between said sector-shaped spacer means, the outer end of said radial passage extending beyond said base so as to communicate with the upstream side of said membrane through said annular flow passage, siad membrane being sufficiently thin to be deflected by pressure in the inlet to partially restrict said radial passage.

2. A flow regulator according to claim 1, wherein siad regulator has an outlet part and an inlet part with flanges, the outer edges of said flanges being connected to one another surrounding said membrane to form said annular socket, each part having connector means to connect into the inlet and outle respectively.

3. A flow regulator according to claim 2, wherein the outer edge of said flange of said outlet part terminates towards said inlet part in said annular socket, the inner wall of said socket being provided with an internal circumferential shoulder for receiving the outer edge of the flange of said inlet part.

4. A flow regulator according to claim 1, wherein the downstream surface of the base of the membrane is provided with central diffuser shaped conically with a rounded tip, said regulator having an outlet channel with an inner bore receiving siad diffuser with its outer surface spaced from siad inner bore.

5. A flow regulator according to claim 4, wherein the upstream suface of said base is provided with a protection cap superposing said diffuser.

6. A flow regulator according to claim 5, wherein at least the center of said protection cap is shaped slightly convex.

7. A flow regulator according to claim 4, wherein the downstream surface of said base has connecting circumferential channel means between said spacer means to provide free flow passages between the radial edges thereof surrounding said diffuser.

8. A flow regulator according to claim 7, including restriction sectors protruding from he downstream surface of said spacer sectors which restriction sectors are narrower and shorter than said spacer sectors, thus defining together with said spacer sectors low-pressure radial channels and said connecting circumferential channel.

9. A flow regulator according to claim 8 wherein the upstream surface of said base is provided with a protection cap, said cap having an outer periphery overlying siad connecting circumferential channel.

10. A flow regulator according to claim 8 wherein the upstream surface of said base is provided with a protection cap, said cap completely overlying said connecting channel and having an outer periphery overlying said restriction sectors.

11. A flow regulator according to claim 9 or 10, wherein said base, spacer sectors, restriction sectors, diffuser and cap are in one piece.

12. A flow regulator according to claims 9 or 10, wherein said base, sectors, and diffuser are intergrally formed of rubber and said cap is metal and vulcanized to said base.

* * * * *